(12) United States Patent
Liang et al.

(10) Patent No.: US 12,259,558 B1
(45) Date of Patent: Mar. 25, 2025

(54) OPTICAL SENSOR AND GLASSES

(71) Applicants: Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

(72) Inventors: Yuan-Ting Liang, Hsinchu (TW); Chung-Wu Liu, Hsinchu (TW); Yi-Huan Chou, Hsinchu (TW); I-Ming Cheng, Hsinchu (TW)

(73) Assignees: Asphetek Solution (Chengdu) Ltd., Chengdu (CN); ADVANCED OPTOELECTRONIC TECHNOLOGY, INC., Hsinchu County (TW); Asphetek Solution Inc., Hsinchu County (TW)

( * ) Notice: Subject to any disclaimer, the term of this patent is extended or adjusted under 35 U.S.C. 154(b) by 0 days.

(21) Appl. No.: 18/406,428

(22) Filed: Jan. 8, 2024

(30) Foreign Application Priority Data

Nov. 23, 2023 (CN) .......................... 202311590762.7

(51) Int. Cl.
*G02B 27/01* (2006.01)
*G02B 5/23* (2006.01)
(Continued)

(52) U.S. Cl.
CPC ........... *G02B 27/0172* (2013.01); *G02B 5/23* (2013.01); *G02F 1/157* (2013.01); *G02F 1/163* (2013.01);
(Continued)

(58) Field of Classification Search
CPC ........ G02B 27/0172; G02B 2027/0118; G02B 2027/0178; G02B 5/23; G02F 1/163; G02F 2201/44; G02F 1/157; G02F 1/133618; G02F 1/15; G02F 1/1336; G09G 3/3406; G09G 2320/0626
See application file for complete search history.

(56) References Cited

U.S. PATENT DOCUMENTS

| 10,614,752 | B1* | 4/2020 | Dodson | ............... G02B 27/281 |
| 10,720,126 | B2* | 7/2020 | Bhat | ........................ H04N 5/58 |
| 2013/0147855 | A1* | 6/2013 | Wang | ........................ G09G 3/20 |
| | | | | 345/690 |

FOREIGN PATENT DOCUMENTS

| CN | 110361866 A | | 10/2019 |
| CN | 111158167 A | * | 5/2020 |
| CN | 115291393 A | | 11/2022 |

* cited by examiner

*Primary Examiner* — Xuemei Zheng
(74) *Attorney, Agent, or Firm* — ScienBiziP, P.C.

(57) ABSTRACT

An optical sensor includes a light source emitting signal light, a light sensing element on an optical path of the signal light, and a photoelectric conversion element on a side of the light sensing element away from the light source. The light sensing element is used to receive ambient light and the signal light on one side and transmit an incident light on another side, wherein a transmittance of the light sensing element changes according to an intensity of the ambient light to adjust an intensity of the incident light transmitted from the light sensing element. The photoelectric conversion element is configured to receive the incident light transmitted from the light sensing element, and to output a voltage modulation signal according to the incident light. A glasses is also provided.

15 Claims, 4 Drawing Sheets

(51) Int. Cl.
*G02F 1/157* (2006.01)
*G02F 1/163* (2006.01)
(52) U.S. Cl.
CPC ................. *G02B 2027/0118* (2013.01); *G02B 2027/0178* (2013.01); *G02F 2001/1635* (2013.01)

OPTICAL SENSOR AND GLASSES

FIELD

The subject matter herein generally relates to head mounted device, and particularly relates to an optical sensor and a glasses including the optical sensor.

BACKGROUND

A conventional augmented reality (AR) glasses or a conventional mediated reality (MR) glasses includes an ambient optical sensor. The ambient optical sensor is used to receive ambient light, so that the glasses can adjust an image brightness according to the ambient light. The ambient optical sensor is generally a complementary metal oxide semiconductor (CMOS). The CMOS has a wide frequency response range, infrared light or ultraviolet light in the ambient light can also be received by the CMOS, in addition to visible light, making it difficult to adjust the image brightness according to ambient light with certain wavelengths. Signals output by the CMOS are easily affected by temperature. The signals output by the CMOS is nonlinear and needs to be converted by a circuit to control the image brightness according to the ambient light having a specific wavelength.

DETAILED DESCRIPTION

Figure 1:
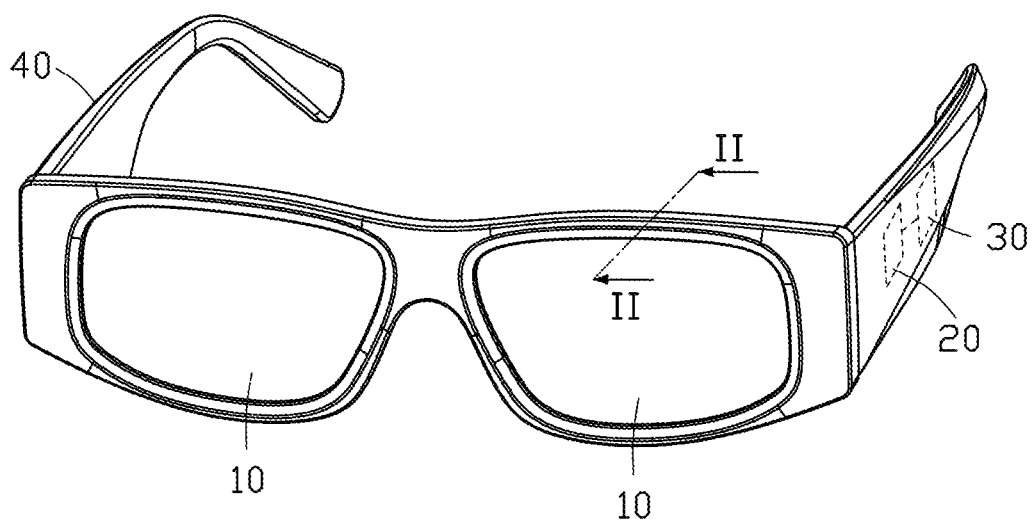
FIG. 1 is an illustration of a pair of glasses according to an embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

"Above" means one layer is located on top of another layer. In one example, it means one layer is situated directly on top of another layer. In another example, it means one layer is situated over the second layer directly or indirectly with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached, or coupled to the other feature or element or an intervening features or elements may be present.

Referring to FIG. 1, a pair of glasses 1 provided in this embodiment of the present disclosure includes two lenses 10, an optical sensor 20, and a glasses frame 40 defined with two installation positions, wherein each lens 10 is fixed in a corresponding installation position. In this embodiment, the optical sensor 20 is embedded in a leg part of the glasses frame 40. The optical sensor 20 may be embedded in any other part of the glasses frame 40 in other embodiments of the present disclosure.

The glasses 1 of the present disclosure is an AR or MR glasses and can work in both a first state and a second state. When the glasses 1 works in the first state, the two lenses 10 display AR or MR images, the optical sensor 20 converts ambient light $L_C$ into a voltage modulation signal, and a transmittance of the two lenses 10 changes with the voltage modulation signal, thereby reducing an impact of brightness of the ambient light $L_C$ on brightness of the AR or MR images displayed by the glasses 1. When the glasses 1 works in the second state, the transmittance of the two lenses 10 does not change with the ambient light $L_C$, and the two lenses 10 are used to transmit or reflect the ambient light $L_C$.

Figure 2:
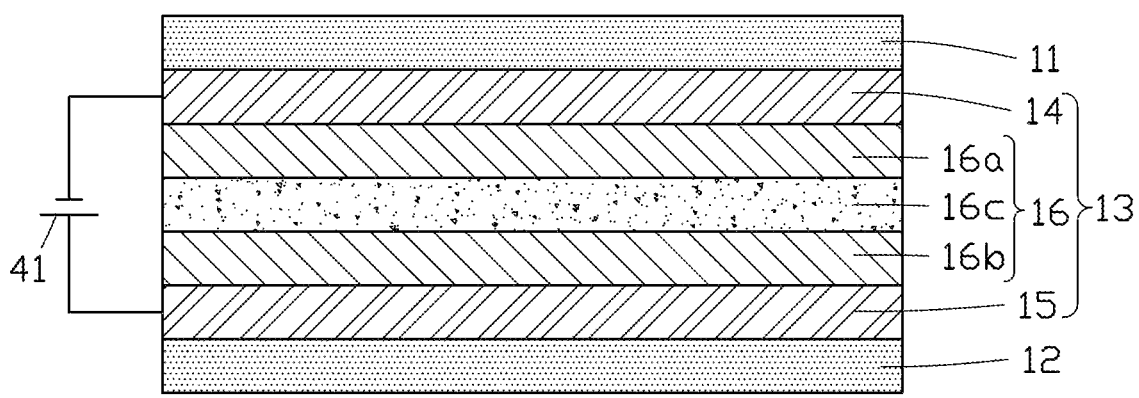
FIG. 2 is a schematic view of a cross-sectional structure of a lens of the pair of glasses, along a view line II-II in FIG. 1.

In this embodiment, the two lenses 10 have essentially the same structure and function. The following takes one of the two lenses 10 as an example. Referring to FIG. 2, the lens 10 includes a transparent lens substrate 11, an electrochromic module 13 on a side of the lens substrate 11, and a display functional layer 12 on a side of the electrochromic module 13 away from the lens substrate 11. The lens substrate 11 is on the side near the ambient light $L_C$, and the display functional layer 12 is on the side near human eye.

The lens substrate 11 can be transparent flat lenses, transparent myopia lenses, or transparent hyperopia lenses. The transparent flat lenses are suitable for users with normal vision, the transparent myopia lenses are suitable for users with myopia, and the transparent hyperopia lenses are suitable for users with hyperopia. According to different user needs, different transparent lenses can be selected as the lens substrate 11 to improve user performance.

The display function layer 12 is used to display images. The images displayed by the display function layer 12 overlays with real environment, allowing the human eye to observe the AR or MR images form the two lenses 10. The display function layer 12 includes a waveguide that can transmit light signals and project the image in glasses 1 onto a display area.

The electrochromic module 13 includes a first transparent conductive layer 14, a second transparent conductive layer 15, and an electrochromic layer 16 between the first transparent conductive layer 14 and the second transparent conductive layer 15. The electrochromic layer 16 is electrically connected to the first transparent conductive layer 14 and the second transparent conductive layer 15, respectively.

In this embodiment, both the first transparent conductive layer 14 and the second transparent conductive layer 15 can be transparent conductive materials such as tin doped indium tin oxide (ITO) or aluminum doped zinc oxide (AZO). The ITO and the AZO have a large bandgap and only absorbing ultraviolet light, not visible light.

The electrochromic layer 16 includes an electrochromic material layer 16a, an ion storage layer 16b, and an electrolyte layer 16c between the electrochromic material layer 16a and the ion storage layer 16b. The electrochromic material layer 16a and the ion storage layer 16b can both be composed of electrochromic materials. The electrochromic materials can be inorganic electrochromic materials such as tungsten trioxide, or organic electrochromic materials such as polythiophene, polythiophene derivatives, viologen, tetrathiafulvalene, metal phthalocyanine compounds, etc. The electrochromic material layer 16a and the ion storage layer 16b may be composed of electrochromic materials with opposite electrochromic performance. The electrolyte layer 16c can be composed of solid material or solution such as lithium perchlorate ($LiClO_4$), aluminum perchlorate ($Al(ClO_4)_3$), or zinc chloride ($ZnCl_2$).

The electrochromic performance in the present disclosure refers to a reversible color change phenomenon of materials under an electric field effect. Electrochromic essentially refers to an electrochemical oxidation-reduction reaction of electrochromic materials under an action of an external electric field, which changes a color of the materials by gaining or losing electrons.

The electrochromic module 13 is electrically connected to the optical sensor 20. The optical sensor 20 is used to convert the ambient light $L_C$ into the voltage modulation signal, and the electrochromic module 13 is used to receive the voltage modulation signal. Voltages applied to the first transparent conductive layer 14 and the second transparent conductive layer 15 change according to the voltage modulation signal, which makes the transmittance of the electrochromic layer 16 in the electrochromic module 13 changing with the voltages.

If the ambient light $L_C$ is detected to have a high brightness, the transmittance of the electrochromic layer 16 decreases, which decreases the ambient light $L_C$ passing through the electrochromic layer 16 and decreases the ambient light $L_C$ reaching the display function layer 12. If the ambient light $L_C$ is detected to have a low brightness, the transmittance of the electrochromic layer 16 increases, which increases the ambient light $L_C$ passing through the electrochromic layer 16 and increases the ambient light $L_C$ reaching the display function layer 12. Therefore, a brightness difference between the ambient light $L_C$ and the images displayed by the function layer 12 is reduced, which is conducive to make the ambient light $L_C$ passing through the electrochromic layer 16 and reaching the display function layer 12 to have the same brightness with the images.

In this embodiment, the electrochromic module 13 between the display functional layer 12 and the lens substrate 11 can change the transmittance according to different brightness of the ambient light $L_C$, which reduces the impact of the ambient light $L_C$ on the images displayed by the display functional layer 12 and improves an image quality of the glasses 1 in different environments, thereby ensuring good visual effects for users.

The optical sensor 20 converts the ambient light $L_C$ into the voltage modulation signal and outputs the voltage modulation signal to the electrochromic module 13. The first transparent conductive layer 14 and the second transparent conductive layer 15 are applied with the voltages according to the voltage modulation signal. The electrochromic material layer 16a undergoes an oxidation-reduction reaction under the voltages, resulting in a change in the transparency itself. The ion storage layer 16b stores counter ions and maintaining a charge balance when the electrochromic material layer 16a undergoes an oxidation-reduction reaction. When the electrochromic material layer 16a and the ion storage layer 16b are composed of electrochromic materials with opposite electrochromic performance (such as the ion storage layer 16b using cathodic reduction color changing material and the electrochromic layer 16a using anodic oxidation color changing material), the electrochromic material layer 16a and the ion storage layer 16b can also achieve a color superposition function or a color complementarity function.

Figure 3:
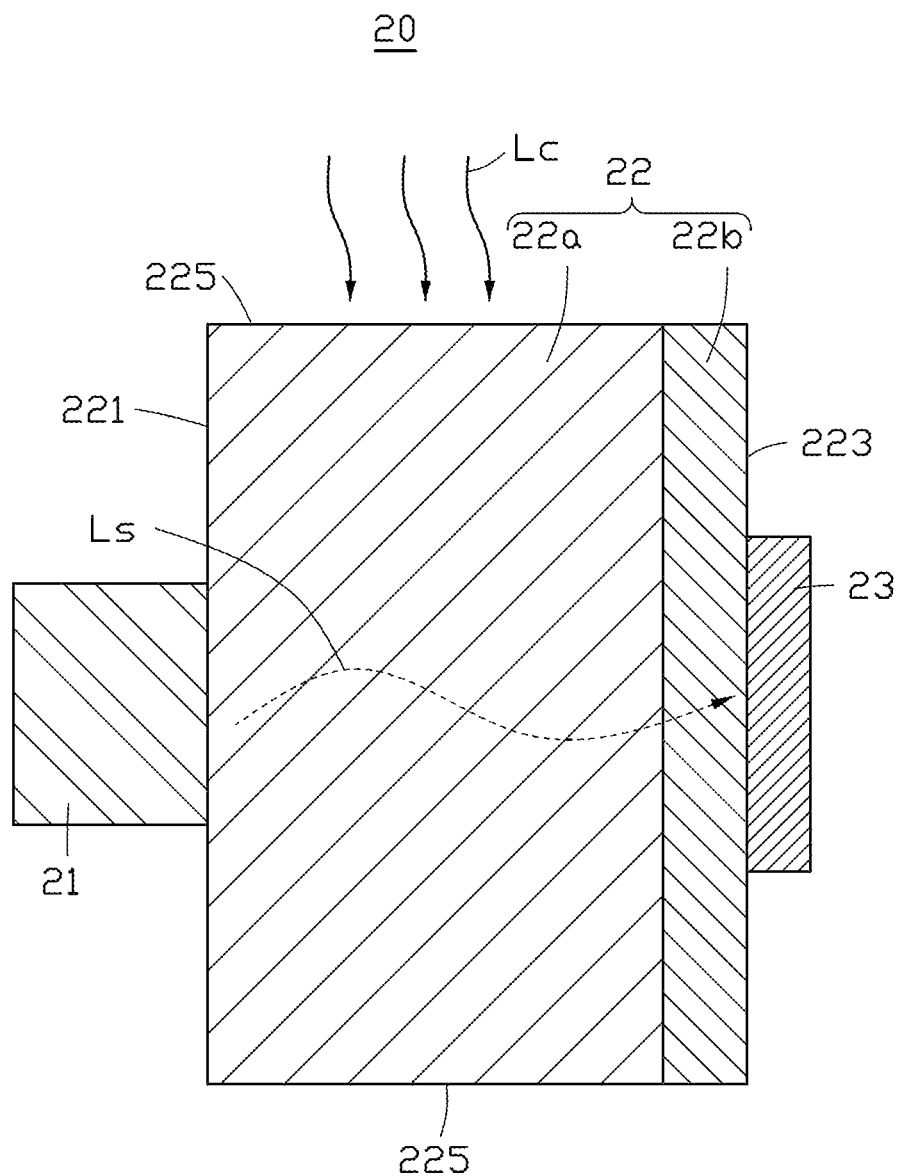
FIG. 3 is a schematic view of a cross-sectional structure of an optical sensor according to an embodiment of the present application.

Referring to FIG. 3, the optical sensor 20 includes a light source 21, a light sensing element 22, and a photoelectric conversion element 23. The light source 21 is used to emit signal light $L_S$. The light sensing element 22 is on a light emitting side of the light source 21 and on an optical path of the signal light $L_S$. The light sensing element 22 is used to receive the ambient light $L_C$ and transmit the signal light $L_S$. The transmittance of the light sensing element 22 changes according to the intensity of the ambient light $L_C$, which can adjust the intensity of the signal light $L_S$ transmitted from one side of the light sensing element to another side of the light sensing element 22. The photoelectric conversion element 23 is on a light transmitting side of the light sensing element 22 away from the light source 21 and is used to receive the signal light $L_S$ transmitted by the light sensing element 22 and output the voltage modulation signal based on the signal light $L_S$.

The light sensing element 22 includes a substrate 22a and a photochromic coating 22b between the light source 21 and the photoelectric conversion element 23.

The light source 21 includes at least one light-emitting element. The light-emitting element may be a light-emitting diode (LED) or a vertical cavity surface emitting laser (VCSEL, also known as a vertical resonant cavity surface emitting laser). The light source 21 has a length of 0.1~3 mm, a thickness of 30~300 mm, and a power of 1~1000 mW.

The photochromic coating 22b in the light sensing element 22 is composed of photochromic material. A color of the photochromic material changes when the photochromic coating 22b irradiated by the ambient light $L_C$ having a specific wavelength, which results in a change in a transparency of the light sensing element 22. Therefore, the light sensing element 22 can change its own transmittance according to the ambient light $L_C$ having specific wavelength. In this embodiment, the light sensing element 22 includes a substrate 22a and a photochromic coating 22b. The light sensing element 22 can only include one layer of photochromic film in other embodiments. In this embodiment, the light sensing element 22 is rectangle-shaped and has a thickness of 22 is 0.1-3 mm, a length of 0.5-5 mm, and a width of 0.5-5 mm. The light sensing element 22 may be square-shaped or circular-shaped in other embodiments.

The photoelectric conversion element 23 includes a photosensitive resistor. The photoelectric conversion element 23 directly receives the signal light $L_S$ and does not receive the ambient light $L_C$. Therefore, the photoelectric conversion element 23 is related to a wavelength of the signal light $L_S$ emitted by the light source 21 and independent of a wavelength of the ambient light $L_C$, so that, the photoelectric conversion element 23 can change its own resistance value according to the brightness of the signal light $L_S$ under the ambient light $L_C$ of any wavelength, thereby changing the voltage modulation signal. The photosensitive resistor can be made of cadmium sulfide (CdS), cadmium selenide (CdSe), gallium arsenide (GaAs), or silicon (Si). The photoelectric conversion element 23 has a length of 0.1-5 mm, a thickness of 0.5-3 mm, a bright resistance of 1-300KΩ, and a dark resistance of 0.1-10MΩ.

In this embodiment, the light sensing element 22 includes a first surface 221 facing the light source 21, a second surface 223 facing the photoelectric conversion element 23, and two opposite surfaces 225 between the first surface 221 and the second surface 223. The signal light $L_S$ emitted by the light source 21 transmit from the first surface 221 to the second surface 223 through the light sensing element 22 and is received by the photoelectric conversion element 23. One of the two surfaces 225 is exposed to the ambient light $L_C$, while the other relative side 225 is isolated from the ambient light $L_C$. The light source 21 and the photoelectric conversion element 23 are completely buried in the glasses frame 40 and isolated from the ambient light $L_C$.

The signal light $L_S$ passes through the light sensing element 22 and incident on the photoelectric conversion element 23 is defined as an incident light. When the ambient light $L_C$ is irradiated on the light sensing element 22, the photochromic coating 22b in the light sensing element 22 absorbs electromagnetic radiation, causing the color of the photochromic coating 22b to change, thereby causing the transmittance of the light sensing element 22 to automatically change according to the ambient light $L_C$. Therefore, the intensity of the incident light changes with the intensity of the ambient light $L_C$, the self-resistance of the photoelectric conversion element 23 changes with the intensity of the ambient light $L_C$, and an electrical signal output by the photoelectric conversion element 23 changes with the self-resistance of the photoelectric conversion element 23, which makes the optical sensor 20 to convert the optical signal into the electrical signal (that is, the voltage modulation signal).

Figure 4:
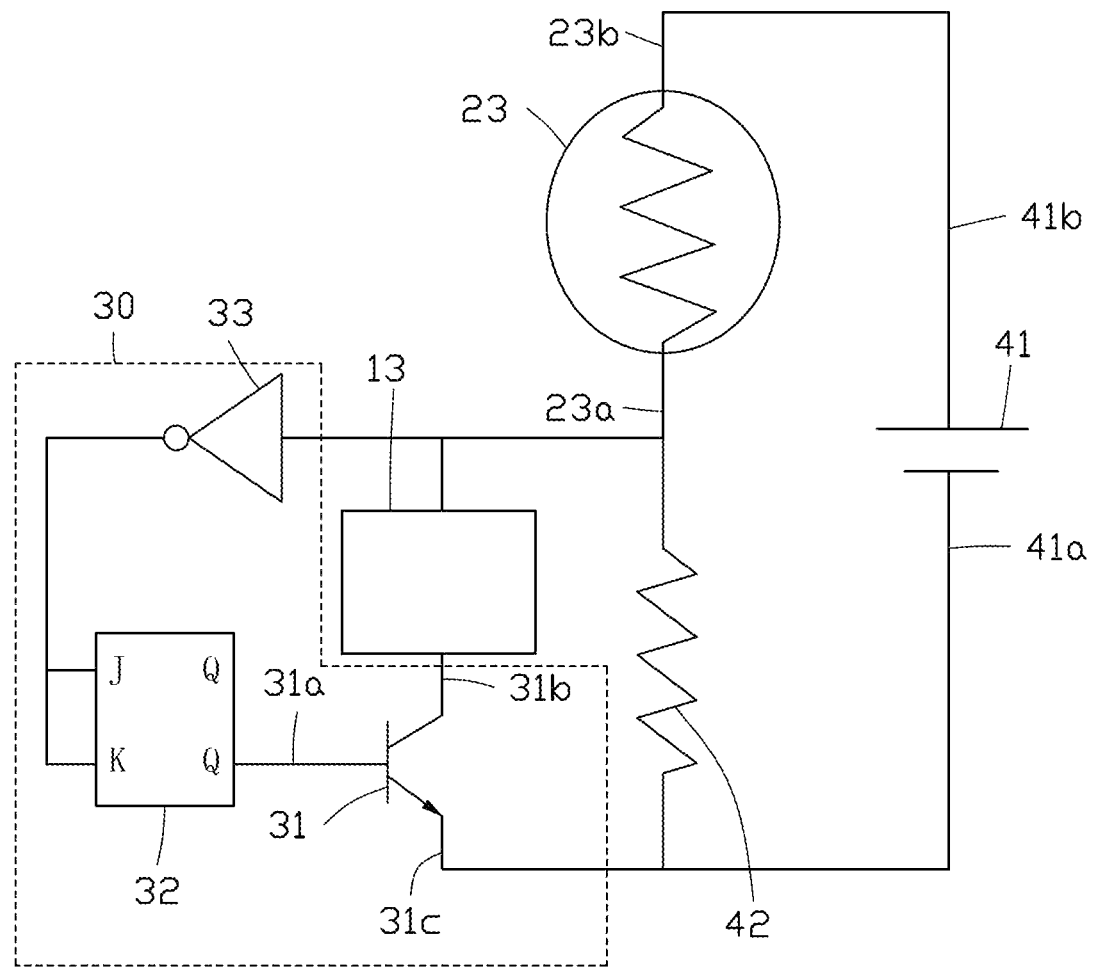
FIG. 4 is a schematic view of a circuit structure of the optical sensor shown in FIG. 3, and an electrochromic module according to an embodiment of the present application.

Referring to FIGS. 1 and 4, the glasses 1 further include a switch circuit 30, a power supply 41, and a resistor 42 embedded in the glasses frame 40. In this embodiment, the switch circuit 30, the power supply 41, and the resistor 42 are all embedded in the leg part of the glasses frame 40 near the optical sensor 20. The switch circuit 30 includes a transistor 31, a JK flip-flop 32, and an inverter 33 connected to a printed circuit board (PCB). The switch circuit 30 is used to control a working status of the glasses 1. The power supply 41 is used to provide voltage to the switch circuit 30. The resistor 42 is used in conjunction with the photoelectric conversion element 23 to adjust a voltage received by the inverter 33.

The transistor 31 can be a triode or a field-effect transistor, both of which include three electrodes. The three electrodes of a triode are a base, a collector, and an emitter, and the three electrodes of a field-effect transistor are a gate, a drain, and a source. In this embodiment, the base or the gate of the transistor 31 is defined as a first electrode 31a, the collector or the drain is defined as a second electrode 31b, and the emitter or the source is defined as a third electrode 31c.

The JK flip-flop 32 has two input terminals connected to an output terminal of the inverter 33 and one output terminal connected to the first electrode 31a of the transistor 31. An input terminal of the inverter 33 is connected to a first end 23a of the photoelectric conversion element 23 in the optical sensor 20, the second electrode 31b of the transistor 31 is connected to an end of the electrochromic module 13 away from the photoelectric conversion element 23. The third electrode 31c of the transistor 31 is connected to a first end 41a of the power supply 41, which is equivalent to connecting a switch between the electrochromic module 13 and the power supply 31. The first transparent conductive layer 14 in the electrochromic module 13 is connected to the first end 23a of the photoelectric conversion element 23 through a wire, the second transparent conductive layer 15 is connected to the first end 41a of the power supply 41 through a wire, and a second end 23b of the photoelectric conversion element 23 is connected to a second end 41b of the power supply 41 through a wire. The resistor 42 is connected between the first end 23a of the photoelectric conversion element 23 and the first end 41a of the power supply 41.

In the switch circuit 30, the photoelectric conversion element 23 outputs a first voltage signal when the ambient light $L_C$ is obstructed (obstructed by a hand for example). The inverter 33 converts the first voltage signal into a second voltage signal. An output signal from the output terminal of the converter 32 switches between the first voltage signal and the second voltage signal when the two input terminals of the JK receives the second voltage signal. The transistor 31 switches to a conductive state when the first electrode 31a receives the first voltage signal, wherein the electrochromic module 13 electrically connected to the switch circuit 30, and the electrochromic module 13 changes its own transmittance according to the brightness of the ambient light $L_C$. The transistor 31 is in a cut-off state when the first electrode 31a receives the second voltage signal, wherein the electrochromic module 13 and the switch circuit is disconnected, and the transmittance of the electrochromic module 13 remains unchanged.

In this embodiment, the switch circuit 30 switches the state of glasses 1 when the ambient light $L_C$ is obstructed. When the glasses 1 works in the first state, the electrochromic module 13 electrically connects to the power supply 41, the optical sensor 20 converts the ambient light $L_C$ into the voltage modulation signal, the photoelectric conversion element 23 transmits the voltage modulation signal to the electrochromic module 13, the transmittance of the electrochromic layer 16 in the electrochromic module 13 changes with the voltage modulation signal, resulting in a change in the brightness of the AR or MR image displayed by the glasses 1. When the glasses 1 work in the second state, the electrochromic module 13 disconnect from the power supply 41, the display function layer 12 does not display any image, the electrochromic layer 16 in the electrochromic module 13 remains transparent, and the lens 10 is used to transmit or reflect the ambient light $L_C$.

The transmittance of the light sensing element 22 changes with the intensity of the ambient light $L_C$, which changes the intensity of the incident light the resistance of the photoelectric conversion element 23. The output voltage modulation signal changes with the resistance of the photoelectric conversion element 23, wherein voltages applied to both sides of the electrochromic module 13 changes, the transparency of the electrochromic module 13 changes, thereby reducing an impact of the ambient light $L_C$ brightness on the brightness of the images displayed by the display function layer 12.

The photoelectric conversion element 23 is used to sense the signal light $L_S$ instead of the ambient light $L_C$, wherein a working wavelength of the photoelectric conversion element 23 has no need to consistent with the wavelength of the ambient light $L_C$. Therefore, the photoelectric conversion element 23 can work under any wavelength of ambient light $L_C$. Since the light sensing element 22 is used to change its own transmittance according to a specific wavelength of ambient light $L_C$, the optical sensor 20 can output the voltage modulation signal according to the specific wavelength of ambient light $L_C$. Therefore, the glasses 1 including the optical sensor 20 can also change the transmittance of the lens 10 according to the specific wavelength of ambient light $L_C$, thereby reducing the brightness difference between the ambient light $L_C$ and the images displayed by the display function layer 12.

Finally, it should be noted that the above embodiments are only used to illustrate the technical solution of the present application and not to limit the present application. Although the present application has been described in detail with reference to preferred embodiments, one ordinary skill in the art should understand that the technical solution of the present application can be modified or equivalent replaced without departing from the spirit and scope of the technical solution of the present application.

What is claimed is:

1. An optical sensor comprising:
   a light source emitting signal light;
   a light sensing element on a light emitting side of the light source and on an optical path of the signal light, the light sensing element being configured to receive ambient light, receive the signal light through one side, and transmit at least a part of the signal light as an incident light through another side, wherein a transmittance of the light sensing element changes according to an intensity of the ambient light and an intensity of the incident light transmitted from the light sensing element changes with the transmittance of the light sensing element; and
   a photoelectric conversion element on a light transmitting side of the light sensing element away from the light source, the photoelectric conversion element being configured to receive the incident light from the light sensing element and output a voltage modulation signal according to the incident light, and the voltage modulation signal changes with the intensity of the incident light.

2. The optical sensor according to claim 1, wherein the light source comprises at least one light-emitting element, each of the at least one light-emitting element is configured to emit the signal light, and a wavelength of the signal light is the same as a working wavelength of the photoelectric conversion element.

3. The optical sensor according to claim 1, wherein the light sensing element comprises a substrate and a photochromic coating on a surface of the substrate, the substrate is between the light source and the photochromic coating, the substrate is configured to support the photochromic coating, a transmittance of the photochromic coating changes according to the intensity of the ambient light, thereby adjusting the intensity of the incident light transmitted from the light sensing element.

4. The optical sensor according to claim 1, wherein the light sensing element comprises a photochromic film, a transmittance of the photochromic film changes according to the intensity of the ambient light, thereby adjusting the intensity of the incident light transmitted from the light sensing element.

5. The optical sensor according to claim 1, wherein the photoelectric conversion element is a photosensitive resistor.

6. A pair of glasses comprising:
   a glasses frame;
   at least one lens fixed on the glasses frame; and
   an optical sensor embedded in the glasses frame and comprising:
      a light source emitting signal light;
      a light sensing element on a light emitting side of the light source and on an optical path of the signal light, the light sensing element being configured to receive ambient light, receive the signal light through one side, and transmit at least a part of the signal light as an incident light through another side, wherein a transmittance of the light sensing element changes according to an intensity of the ambient light and an intensity of the incident light transmitted from the light sensing element changes with the transmittance of the light sensing element; and
      a photoelectric conversion element on a light transmitting side of the light sensing element away from the light source, the photoelectric conversion element being configured to receive the incident light from the light sensing element and output a voltage modulation signal according to the incident light, and the voltage modulation signal changes with the intensity of the incident light.

7. The pair of glasses according to claim 6, wherein the light source comprises at least one light-emitting element, each of the at least one light-emitting element is configured to emit the signal light, and a wavelength of the signal light is the same as a working wavelength of the photoelectric conversion element.

8. The pair of glasses according to claim 6, wherein the light sensing element comprises a substrate and a photochromic coating on a surface of the substrate, the substrate is between the light source and the photochromic coating, the substrate is configured to support the photochromic coating, a transmittance of the photochromic coating changes according to the intensity of the ambient light, thereby adjusting the intensity of the incident light transmitted from the light sensing element.

9. The pair of glasses according to claim 6, wherein the light sensing element comprises a photochromic film, a transmittance of the photochromic film changes according to the intensity of the ambient light, thereby adjusting the intensity of the incident light transmitted from the light sensing element.

10. The pair of glasses according to claim 6, wherein the photoelectric conversion element is a photosensitive resistor.

11. The pair of glasses according to claim 6, wherein the light sensing element comprises a first surface facing the light source, a second surface facing the photoresistor, and two opposite surfaces between the first surface and the second surface, one of the two opposite surfaces is exposed to the ambient light, and the photoelectric conversion element is isolated from the ambient light.

12. The pair of glasses according to claim 6, wherein the at least one lens comprises a lens substrate and an electrochromic module on one side of the lens substrate, the electrochromic module is electrically connected to the photoelectric conversion element, a transmittance of the electrochromic module changes according to the voltage modulation signal output by the photoelectric conversion element.

13. The pair of glasses according to claim 12, wherein the electrochromic module comprises a first transparent conductive layer, a second transparent conductive layer, and an electrochromic layer between the first transparent conductive layer and the second transparent conductive layer, and the voltage modulation signal is applied to the first transparent conductive layer and the second transparent conductive layer to control a transparency of the electrochromic layer.

14. The pair of glasses according to claim 12 further comprising a switch circuit embedded in the glasses frame, the switch circuit is electrically connected to the photoelectric conversion element and the electrochromic module, and the switch circuit is configured to control connecting or disconnecting between the photoelectric conversion element and the electrochromic module, wherein the transmittance of the electrochromic module changes according to the voltage modulation signal when the switch circuit controls to connect the photoelectric conversion element and the electrochromic module.

15. The pair of glasses according to claim 14, wherein the switch circuit further switches the pair of glasses between a first state and a second state, a transmittance of the at least one lens remains constant when the pair of glasses is in the first state, and the transmittance of the at least one lens changes with the ambient light when the pair of glasses is in the second state.

\* \* \* \* \*